United States Patent
Ikeda

(10) Patent No.: US 7,227,667 B2
(45) Date of Patent: *Jun. 5, 2007

(54) PRINTER CONTROLLER RESPONSIVE TO SKEW AND MAGNIFICATION ERROR

(75) Inventor: Hidetoshi Ikeda, Dazaifu (JP)

(73) Assignee: Matsushita Electric Indtustrial Co., Ltd., Osaka (JP)

(*) Notice: Subject to any disclaimer, the term of this patent is extended or adjusted under 35 U.S.C. 154(b) by 930 days.

This patent is subject to a terminal disclaimer.

(21) Appl. No.: 09/985,083

(22) Filed: Nov. 1, 2001

(65) Prior Publication Data
US 2002/0054347 A1    May 9, 2002

(30) Foreign Application Priority Data
Nov. 7, 2000 (JP) ............... 2000-338663

(51) Int. Cl.
    G06K 15/02    (2006.01)
(52) U.S. Cl. ............... 358/1.9; 399/395
(58) Field of Classification Search ............... 358/1.9
    See application file for complete search history.

(56) References Cited

U.S. PATENT DOCUMENTS

| | | | | |
|---|---|---|---|---|
| 5,587,771 A | * | 12/1996 | Mori et al. ............... | 399/72 |
| 5,708,513 A | * | 1/1998 | Hasuo et al. ............... | 358/450 |
| 5,995,717 A | * | 11/1999 | Tanaka ............... | 358/1.9 |
| 6,371,669 B1 | * | 4/2002 | Ikeda ............... | 400/63 |
| 6,559,976 B1 | * | 5/2003 | Hirota ............... | 358/3.03 |
| 6,733,101 B2 | * | 5/2004 | Katayama et al. ............... | 347/14 |
| 6,798,534 B1 | * | 9/2004 | Nishigaki et al. ............... | 358/1.16 |

\* cited by examiner

Primary Examiner—Aung S. Moe
Assistant Examiner—Jacob P. Rohwer
(74) Attorney, Agent, or Firm—Stevens, Davis, Miller & Mosher, LLP

(57) ABSTRACT

A printer controller comprising a rasterizing part for producing raster data as printing data, a skew correcting part for correcting the raster data for a skew error in accordance with a correction coefficient delivered form the color image forming device and indicating a skew error, a compression part for compressing the raster data corrected for the skew error so as to deliver the compressed raster data, and storing the compressed raster data in memory, an expansion part for expanding the compressed raster data so as to restore the raster data, and a magnification correcting part for correcting the raster data delivered from the expansion part, for a magnification error accordance with correction coefficient delivered from the color image forming device and indicating a magnification error. With this configuration, it is possible to eliminate the necessity of line memory.

4 Claims, 9 Drawing Sheets

RASTERIZED DATA

SKEW CORRECTION

DATA COMPRESSION

STORAGE

DATA EXPANSION

MAGNIFICATION CORRECTION

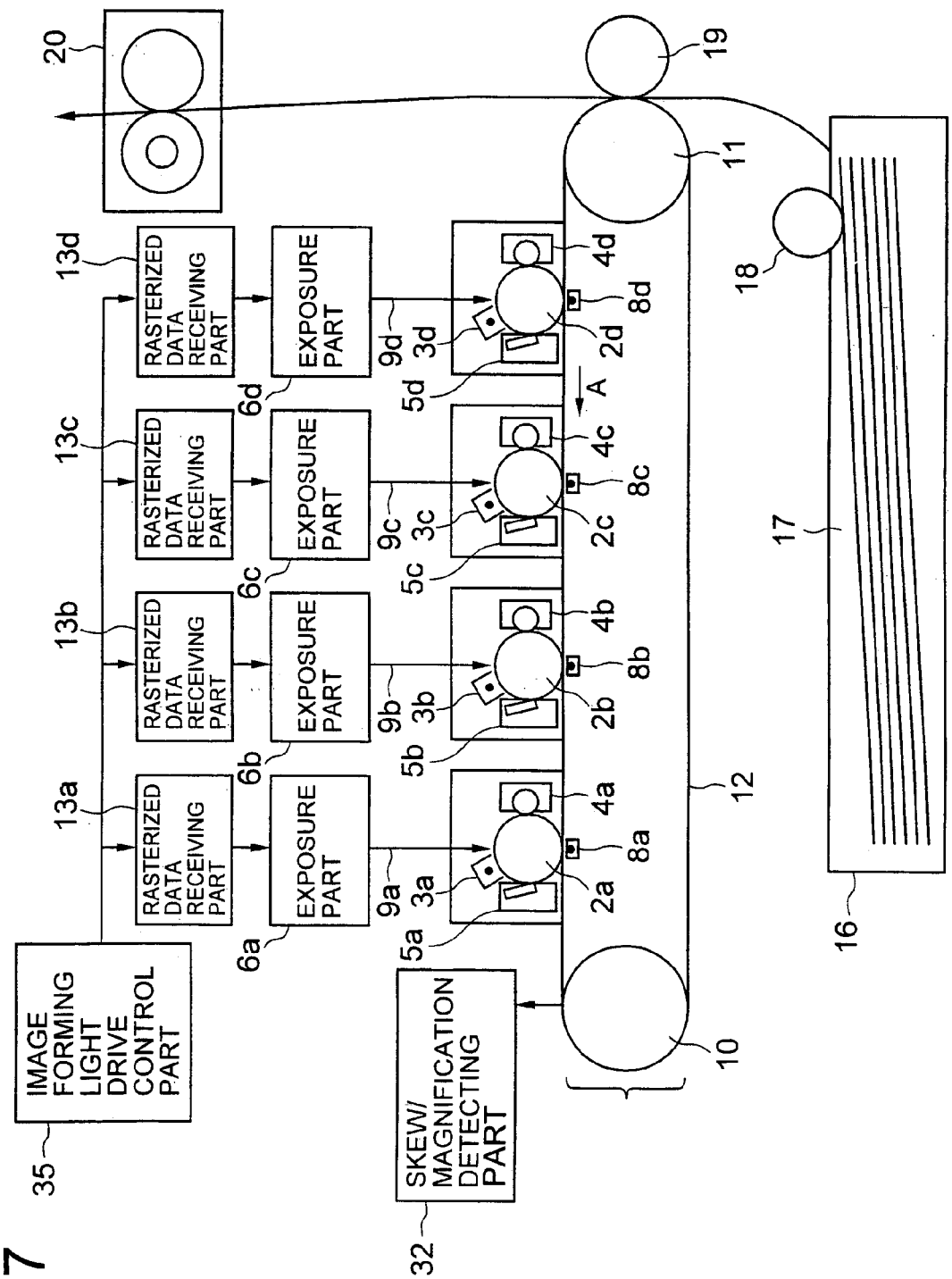

RASTERIZED DATA

SKEW CORRECTION

MAGNIFICATION CORRECTION

PRINTER CONTROLLER RESPONSIVE TO SKEW AND MAGNIFICATION ERROR

BACKGROUND OF THE INVENTION

1. Field of the Invention

The present invention relates to a printer controller for creating and delivering printing data (raster data) which is received by a color image forming device for forming an image.

2. Related Art

Recently, full color printer devices using an electrophotographic process or an ink jet system have been prosperously used as office printers, that is, output terminal units for personal computers, workstations or the like.

Referring to FIG. 5 which is a configuration view illustrating a color printer in general, there are shown a personal computer 30, a printer 31, a printer controller 100 which is one of components of the printer 31, and a color image forming device 200 which is also one of the components of the printer 31.

As shown in FIG. 5, printing in the printer 31 using a electrophotographic system is carried out in such a way that printing data created by the personal computer 30 is received through an interface by the printer 31 for forming an image. It is noted that a CAD, a workstation or a digital camera may be used, instead of the personal computer 30.

The configuration of the printer 31 will be detailed. As shown in FIG. 5, the printer includes therein the printer controller 100 and a printer engine 200.

Referring to FIG. 6 which is a block diagram illustrating the printer controller 100, there are shown a receiving part 101 for receiving printing data, an interpreter part 102 for interpreting languages for the printing data, a rasterizing part 103 for converting the interpreted printing data into raster data, a compression part 104 for compressing the raster data and for delivering a compressed raster data, a memory 105 for storing the compressed raster data, an expansion part 106 for restoring the compressed raster data, and a data transmission part 107 for transmitting the restored data to the color image forming device (printer engine) 200.

As shown in FIG. 6, in the printer controller 100, the receiving part 101 receives printing data such as data including print language, bit map data or mixture thereof, concerning a document to be printed. The printing data in the form of the print language is interpreted by the interpreter part 102, and is converted by the rasterizing part 103 into raster data with which the printer engine 200 forms an image. As to the volume of raster data for four-color printing, estimating that the degree of resolution is 600 dpi while the size of a printing sheet is A3, and a gradation is binary, the data size becomes 35 Mbytes. Further, should the degree of resolution be increased, or should data for a plurality of pages be once rasterized, the volume of raster data would be extensive, and accordingly, a mass memory for temporarily storing the rater data would be required. Thus, there has been in general used such a technique that the volume of the raster data is reduced by the compression part 104 so as to decrease the volume of the data. The data which has been compressed is once stored in the memory 105, and the compressed data is then restored by the expansion part 106 before the data is transmitted to the printer engine 200 through the data transmission part 107.

Meanwhile, the printer engine 200 carries out image formation after a latent image is formed in accordance with the raster data delivered from the printer controller 100.

Referring to FIG. 7 which is a schematic view illustrating a printer engine 200, there are shown image forming stations 1a to 1d, photosensitive media 2a to 2d, chargers 3a to 3d, developing units 4a to 4d, cleaning units 5a to 5d, exposure units 6a to 6d, transfer units 8a to 3d, exposure beams 9a to 9d, support rollers 10, 11, an intermediate transfer belt 12 serving as a image bearing medium, raster data receiving parts 13a to 13d, a pattern detecting part 14, a paper feed cassette 16, sheet materials 17, a paper feed roller 18, a sheet material transfer roller 19, a fixing unit 20, a skew/magnification detecting part 32, and an image forming light drive control part 35.

As shown in FIG. 7, the printer engine 200 includes a plurality of image forming stations 1a to 1d for carrying our processes of forming images so as to form color images such as a cyan image, a magenta image, a yellow image and a black image which is preferable, on the intermediate transfer belt 12, and then, the images on the intermediate transfer belt 12 are transferred onto a sheet material 17, being superposed with one other, at an image transfer position so as to form a full color image. The above-mentioned printer engine which is a tandem type has been proposed. Such a tandem type printer engine is advantageous in view of speed-up of the image formation since the plurality of image forming parts are provided for the color images, respectively.

However, there has been raised such a problem that how the color images which are formed respectively in the different image forming parts can be satisfactorily aligned with one another because deviation among four color image forming positions causes positionnal deviation or color tone variation, finally.

Next, the positional deviation among transferred images will be explained with reference to FIGS. 8a to 10. FIG. 8a is a view for explaining a positional deviation in the travelling direction of the transfer medium, that is, in the direction of the arrow A in the figure, (this positional deviation will be referred to "vertical scanning positional deviation"), FIG. 8 is a view for explaining a positional deviation in a scanning direction, that is, the direction orthogonal to the direction of the arrow A, (this positional deviation will be referred to "horizontal scanning positional deviation), FIG. 8c is a view for explaining a positional deviation in a skew direction (this positional deviation will be referred to "skew error"), FIG. 8d is a view for explaining a magnification error, and FIG. 8e is a view for explaining a curving error. FIG. 9 is a block diagram illustrating parts relating to correction for skew and magnification in the color image forming device, and FIGS. 10 to 10c are views for explaining correction for skew and magnification errors in a conventional printer engine.

Referring to FIG. 9, there are shown a printer controller 100, a color image forming device 101, a skew/magnification detecting part 32 for transmitting a skew error and a magnification error, a skew/magnification correction coefficient computing part 33 for computing a skew correction coefficient and a magnification correction coefficient from detected errors, a skew/magnification correcting part for correcting the skew errors and the magnification error in accordance with the skew correction coefficient and the magnification correction coefficient, an image forming beam drive control part 35 for driving and controlling an image forming beam, and a line memory for storing therein data.

As to the kinds of positional deviations in a transferred image, as shown in FIGS. 8a to 8e, there are presented the vertical scanning positional deviation (Refer to FIG. 8a), the horizontal scanning positional deviation (Refer to FIG. 8b), the skew error (FIG. 8c), the magnification error (Refer to FIG. 8d), and the curving deviation (Refer to FIG. 8e). However, the above-mentioned five kinds of deviations and errors are superposed with one another, being actually exhibited.

Further, as to main causes of the above-mentioned positional deviations, the vertical scanning positional deviation (Refer to FIG. 8a) is caused by installations errors of the image forming stations and the scanning optical systems, and as well, by installation errors of lenses and mirrors (which are not shown) in the scanning optical systems, and the horizontal scanning positional deviation (Refer to FIG. 8b) rly caused thereby. Accordingly, these deviations can be simply eliminated, for example, by electrically adjusting the timing of the exposures 6a to 6d of raster data.

The skew error shown in FIG. 8c is caused by angular errors of the rotary shaft of a photosensitive drum and angular installation error of the scanning optical systems, in the image forming station. The magnification errors (Refer to FIG. 8d) is caused by deviations in the scanning length due to the optical lengths from the scanning optical systems to the photosensitive drums in the image forming stations, and the curving error (refer to FIG. 8e) is caused by errors of the assembly of the lenses in the scanning optical systems.

Accordingly, there has been proposed the following correcting manner: the above-mentioned five kinds of deviations are detected from reference patterns (register patterns) which have been drawn previously, by means of the skew/magnification detecting part 32 (detection of a positional deviation), and then, degrees of alignment (skew values and magnifications) for images in accordance with the deviations are calculated from the result of the detection by the skew/magnification correction coefficient computing part 33 so that correction is made by the skew/magnification correcting part 34.

FIGS. 10a to 10c show the manner of this correction. Referring to FIG. 10a, a rectangle to be drawn, indicated by the chain line is actually depicted as being indicated by a solid line due to a skew error and a magnification error with no correction. Accordingly, pixels are shifted in the vertical scanning direction on the basis of a skew correction angle α as shown in FIG. 10a, and thereafter, the pixels are enlarged (reduced) in the main scanning direction on the basis of a magnification correction rate β as shown in FIG. 10c. It is noted that FIGS. 10a to 10c are drawn, being exaggerated more or less in order to clarify the skew correction. However, actually, the correction is made with a minimum unit of the resolution of vertical scanning.

Should the correction for deviations and errors shown in FIGS. 10a to 10c be made, as mentioned above, in the printer engine 200, the line memory 36 would be required for storing data having a volume corresponding to a number of lines for the correction in the vertical scanning direction of printing, as shown in FIG. 9.

As mentioned above, the conventional printer controller has raised such a problem that a line memory 36 is additionally required for produced raster on the printer engine side in order to correct a skew and a magnification of the printer engine 200.

In this printer controller, it is required to eliminate the necessity of a line memory, by correcting skew and magnification errors within the printer controller.

SUMMARY OF THE INVENTION

The present invention is devised in order to satisfy the above-mentioned requirements, and accordingly, an object of the present invention is to provide a printer controller which can eliminate the necessity of a line memory.

To the end, according to the present invention, there is provided a printer controller for delivering printing data to a color image forming device for forming a synthetic image in which a plurality of color images are superposed with one another, comprising a rasterizing part for producing raster data as the printing data; a skew correcting part for correcting the raster data for a skew error therein in accordance with a correction coefficient delivered from the color image forming device and indicating a skew error; a compression part for compressing the raster data corrected for the skew error, and for delivering the thus compressed raster data so as to store the compressed raster data in a memory; an expansion part for expanding the stored and compressed raster data so as to restore the raster data; and a magnification correcting part for correcting the raster data delivered from the expansion part for a magnification error in accordance with a correction coefficient delivered from the color image forming device and indicating a magnification error.

With this arrangement, there can be provided a printer controller which can eliminate the necessity of line memory.

According to a first aspect of the present invention, there is provided a printer controller for delivering printing data to a color image forming device for forming a synthetic image in which a plurality of color images are superposed with one another, comprising a rasterizing part for producing raster data as printing data, a skew correcting part for correcting the raster data for a skew error in accordance with a correction coefficient delivered from the color image forming device and indicating a skew error, a compression part for compressing the raster data which is corrected for the skew error so as to deliver the compressed raster data, and for storing the same in a memory; an expansion part for expanding the stored compressed raster data so as to restore the raster data, and a magnification correcting part for correcting the raster data delivered from the expansion part for a magnification error in accordance with a correction coefficient and indicating delivered from the color image forming device and a magnification error.

With this arrangement in which the raster data (printing data) corrected for the skew error during compression within the printer controller can be transmitted to the printer engine while the raster data is corrected for the magnification error during expansion thereof, thereby it is possible to materialize the function of correction of a skew and a magnification at a low cost without adding a line memory on the printer engine side.

Explanation will be hereinbelow made of embodiments of the present invention with reference the accompanying drawings in which:

BRIEF DESCRIPTION OF THE DRAWINGS

FIG. 7 is a block diagram illustrating a printer engine;

DESCRIPTION OF PREFERRED EMBODIMENTS OF THE INVENTION

Embodiment 1

Figure 1:
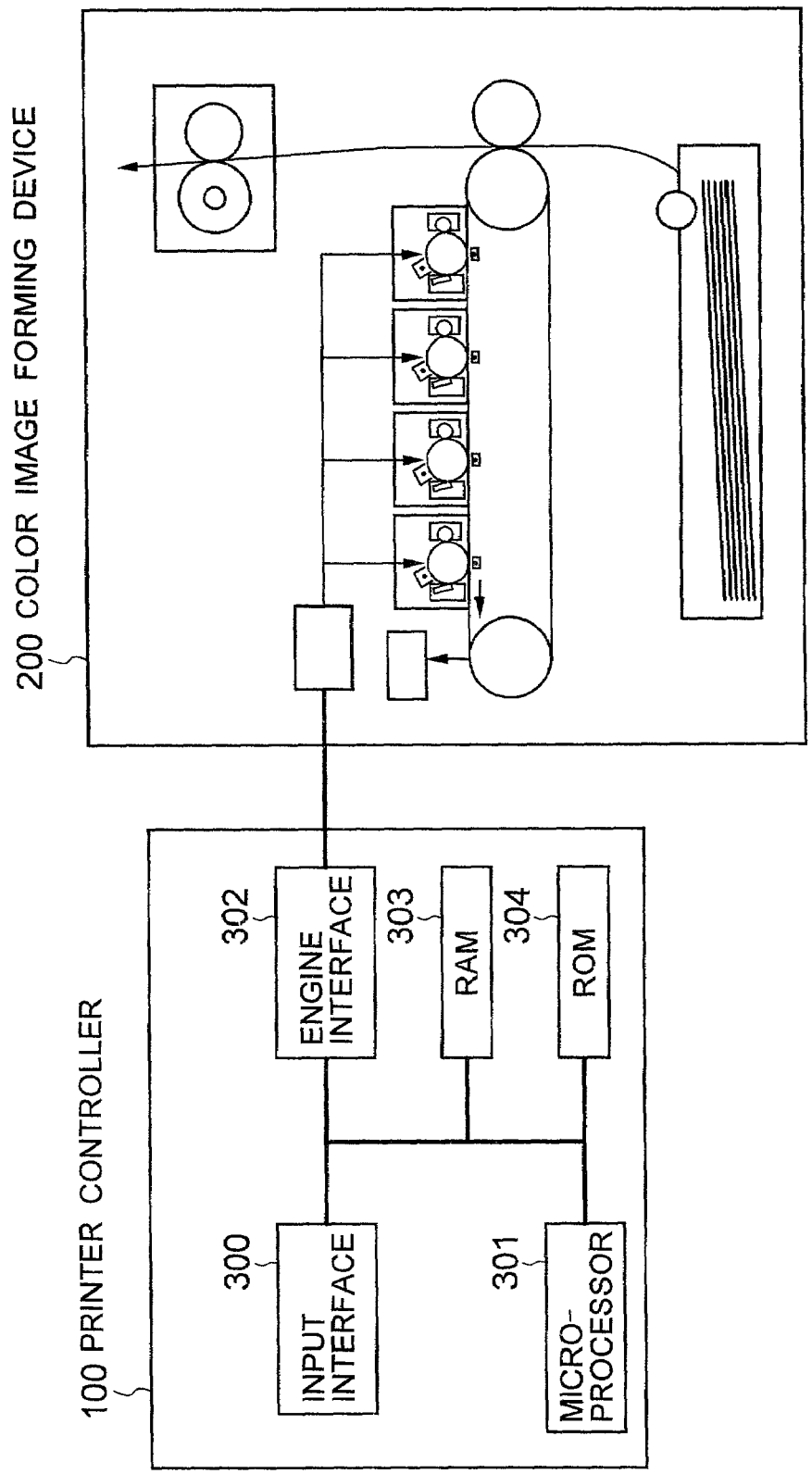
FIG. 1 is a block diagram schematically illustrating a printer controller and a printer engine in a first embodiment of the present invention.

Referring to FIG. 1 which is a block diagram illustrating a schematic configuration of a printer controller 100 and a printer engine (color image forming device) 200 in an embodiment 1 of the present invention, there are shown an input interface part 300 for receiving printing data, printing control commands and the like, a microprocessor 301 for carrying out a data process, a communication process, data flow control and the like, an engine interface part 302 serving as an interface with respect to a printer engine 200, a RAM 303, and a ROM 204 for storing therein a processing program, font data and the like.

Figure 2:
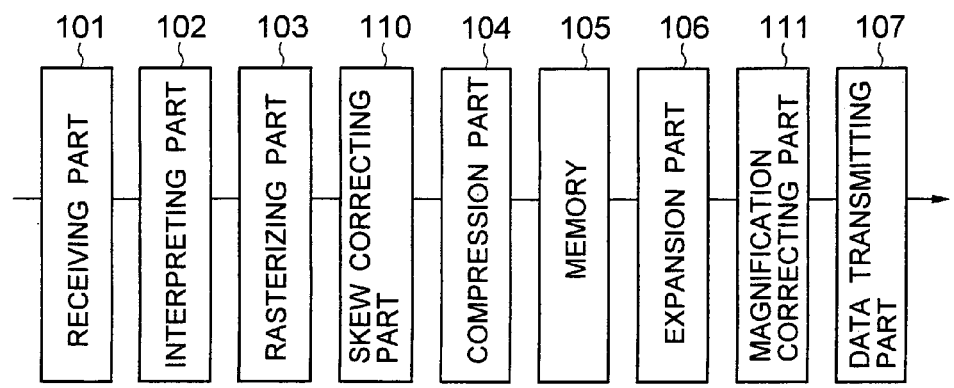
FIG. 2 is a functional block diagram illustrating a color image forming device.

Referring to FIG. 2 which is a functional block diagram illustrating the printer control 100 shown in FIG. 1, and which is mainly materialized through the function of the microprocessor 301, there are shown a receiving part 101 for receiving printing data, an interpreter part 102 for interpreting languages for the printing data, a rasterizing part 103 for converting the interpreted printing data into raster data, a skew error correcting part 110 for converting a skew error, a compression part 104 for compressing the raster data so as to deliver the compressed raster data, a memory 105 for storing therein the compressed raster data, an expansion part 106 for restoring the compressed raster data, a magnification correcting part 111 for correcting a magnification error, and a data transmitting part 107 for transmitting the restored raster data to a color image forming device (printer engine) 200. It is noted that the receiving part 101, the memory 105, and the data transmitting are materialized by hardware while the interpreter part 102, the rasterizing part 103, the skew correcting part 110, the compression part 104, the expansion part 106 and the magnification correcting part 111 are materialized by software. However, it is noted that the interpreter part 102, the rasterizing part 103, the skew correcting part 110, the compression part 104, the expansion part 106 and the magnification correcting part 111 may be also materialized by hardware.

Explanation will be hereinbelow made of the printer control configured as mentioned above.

In the printer controller 100, printing data with which a document is to be printed, is received in the form of a print language, a bit map or the combination thereof by the receiving part 101. The printing data received in the form of the print language, is interpreted by the interpreter part 102 for the language, and is then converted by the rasterizing part 103 into raster data with which the printer engine 200 forms an image.

It is noted that in the case of a printer carrying out four color (cyan, magenta, yellow, and black) printing, the volume of the raster data for all colors, becomes a data size of 32 Mbytes if the printing is made with a degree of resolution of 600 dpi, a printing sheet has a A4 size and a gradation is binary. Further, should the degree of resolution be increased or should data for a plurality of pages be rasterized, the volume of the raster data would become excessive, and accordingly, a large capacity of memory for temporarily storing the data would be required. Thus, in general, should data be rasterized in the compression part 104, the volume of the raster data become excessive, and accordingly, a large capacity of memory for temporarily storing the data is required. Accordingly, there has been in general used such a technique that the volume of the raster data is reduced in the compression part 104. It is noted that the reason why the raster data is accumulated in the memory 105 is to convenient for printing.

Figure 3:
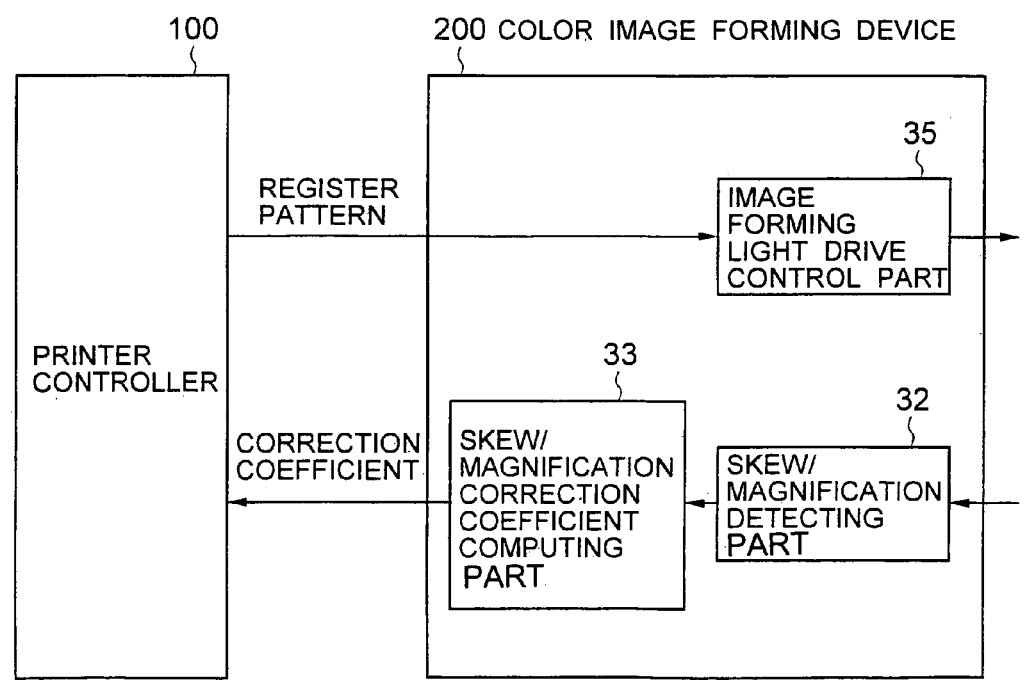
FIG. 3 is a block diagram illustrating a section relating to the correction of a skew and a magnification in the color image forming device.

However, the tandem type printer engine 200 which has been already explained in the description of the related art with reference to FIG. 7, involves five kinds of deviations as shown in FIG. 8. Accordingly, as shown in FIG. 3, a reference pattern (registration pattern) is previously transmitted from the printer controller 100 as shown in FIG. 3, by way of an image forming light drive control part 35 in order to draw an image thereof in the tandem type image forming device 200 shown in FIG. 7. Then, the thus drawn pattern is detected by the skew magnification rate detecting part 32 shown in FIGS. 7 and 3 (detection of a positional deviation), alignment values (a degree of skew and a degree of magnification) of images in accordance with a positional deviation are calculated from the result of the detection by the skew/magnification correction coefficient computing part 33, and the calculated values are transmitted to the printer controller 100 for information.

Next, operation for correction of the skew and the magnification in the printer controller 200 shown in FIG. 2 will be explained with reference to FIGS. 4a to 4f which are views for explaining the correction of skew and magnification, the compression and the expansion of data in this embodiment.

Figure 4A:
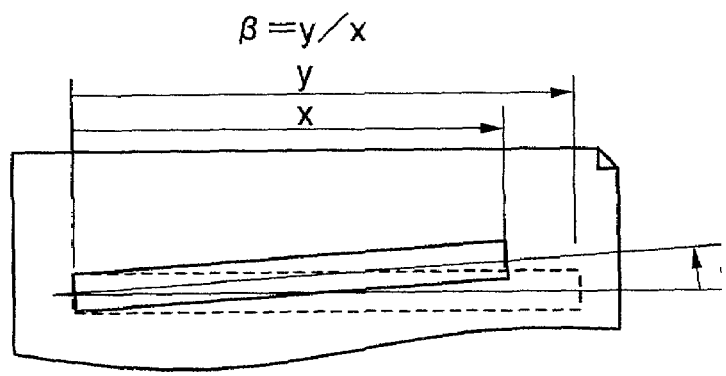
FIG. 4a is an explanatory view for explaining correction for a skew and a magnification, and compression and expansion of raster data.
Figure 4B:
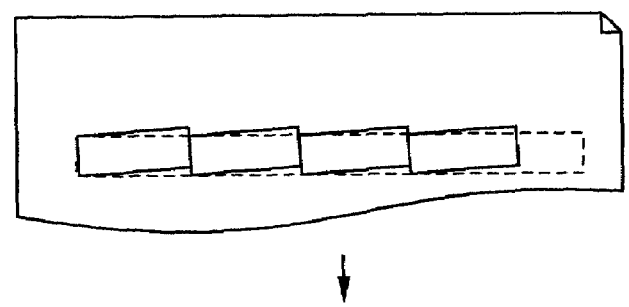
FIG. 4b is an explanatory view for explaining correction for a skew and a magnification, and compression and expansion of raster data.

Estimation is made such that alignment values of the images in accordance with the above-mentioned deviation are a degree $\alpha$ of skew and a degree $\beta$ of magnification. Data becomes those after the correction of a skew is shown in FIG. 4b.

Figure 4C:
FIG. 4c is an explanatory view for explaining correction for a skew and a magnification, and compression and expansion of raster data.
Figure 4D:
FIG. 4d is an explanatory view for explaining correction for a skew and a magnification, and compression and expansion of raster data.
Figure 4E:
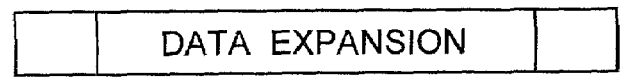
FIG. 4e is an explanatory view for explaining correction for a skew and a magnification, and compression and expansion of raster data.

After the correction for a skew error in the skew correcting part 110 shown in FIG. 2, the data are compressed successively in the compression part 104 (FIG. 4c).

Figure 4F:
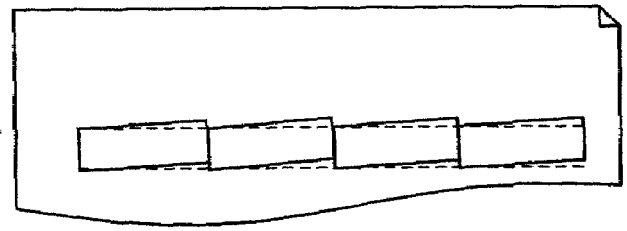
FIG. 4f is an explanatory view for explaining correction for a skew and a magnification, and compression and expansion of raster data.
Figure 5:
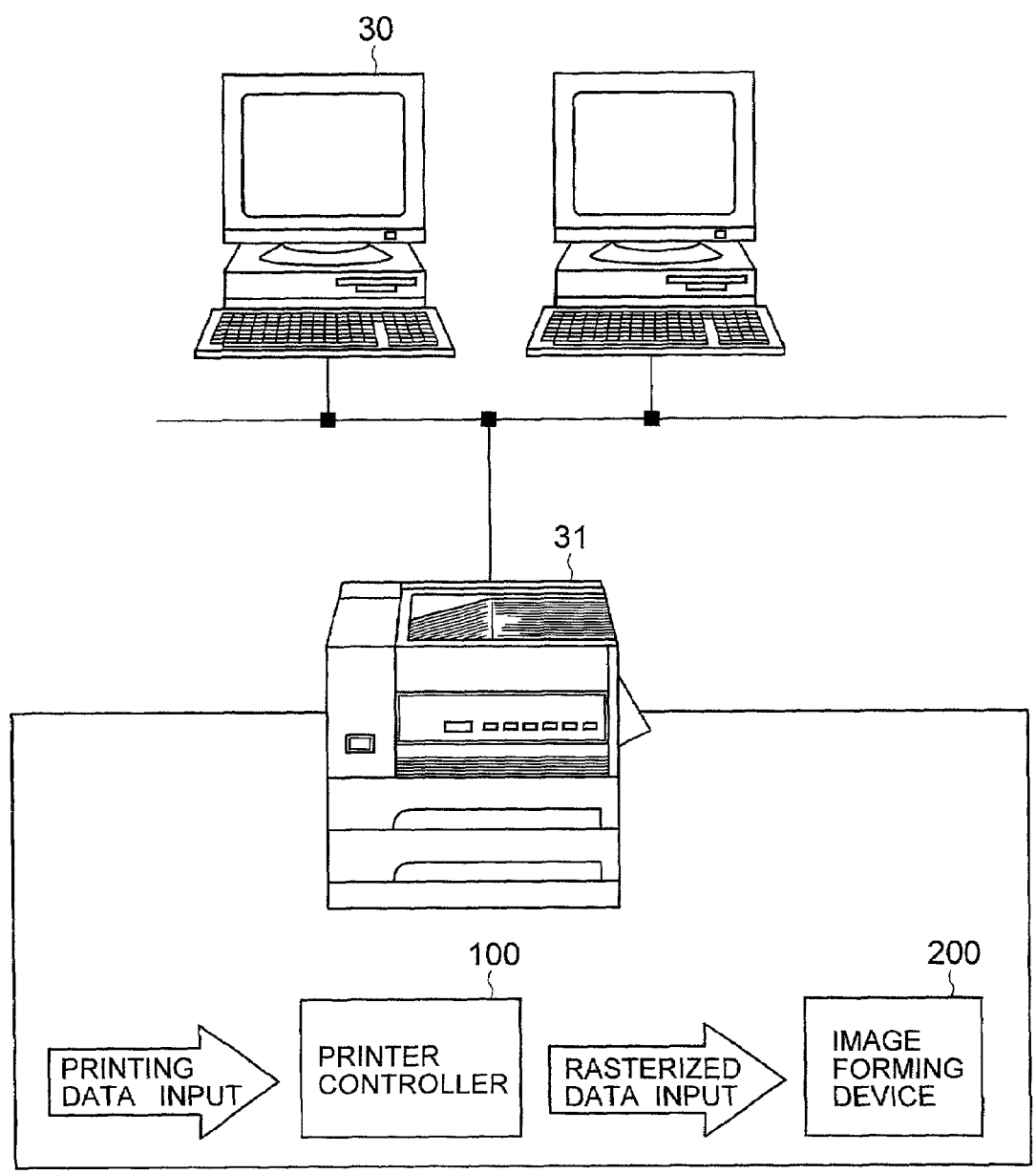
FIG. 5 is a block diagram illustrating a typical color printer.
Figure 6:
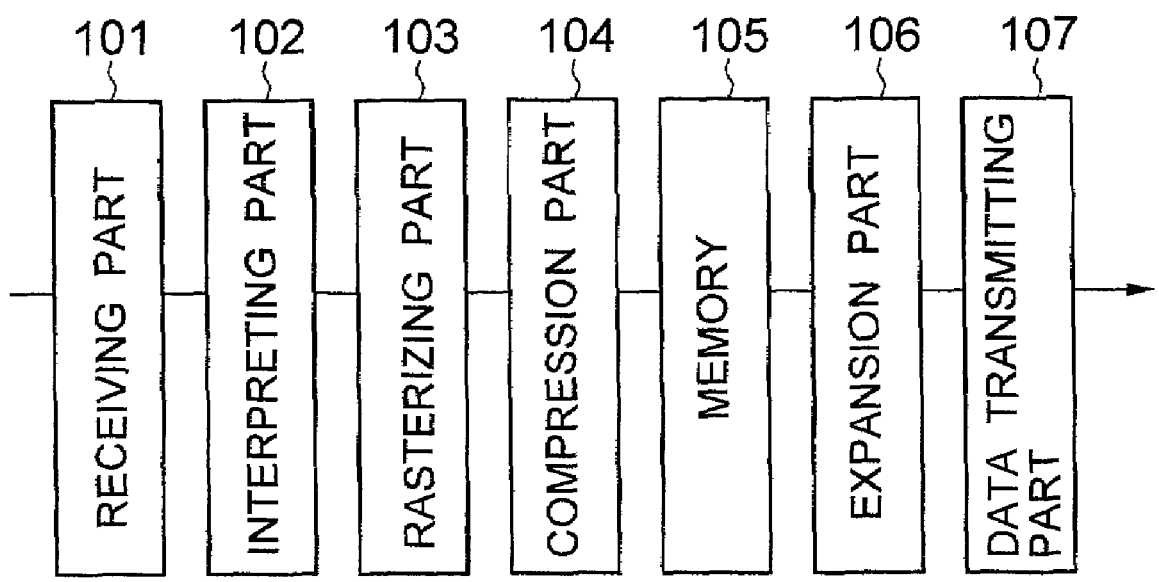
FIG. 6 is a block diagram illustrating a printer controller.
Figure 8A:
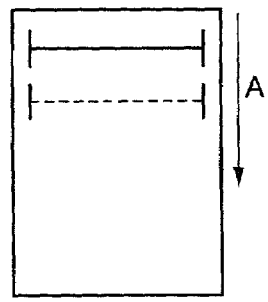
FIG. 8a is a view for explaining a positional deviation in a traveling direction of a transfer medium.
Figure 8B:
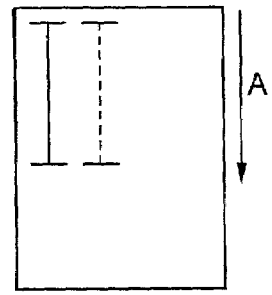
FIG. 8b is a view for explaining a positional deviation in a scanning direction.
Figure 8C:
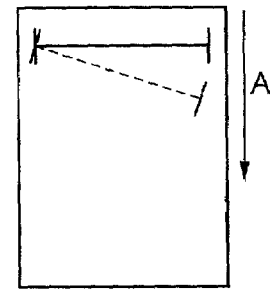
FIG. 8c is a view for explaining a positional deviation in a skew direction.
Figure 8D:
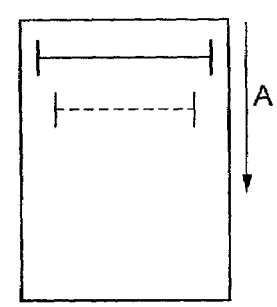
FIG. 8d is a view for explaining a magnification error.
Figure 8E:
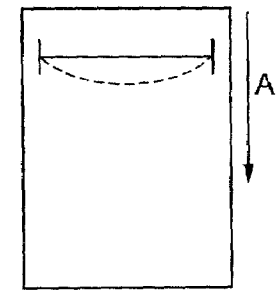
FIG. 8e is a view for explaining a curving error.

The compressed data are once in the memory part 105, and are then expanded by the expansion part 106 before printing, and are then subjected to the correction of magnification in accordance with the above-mentioned magnification correction value in the magnification correcting part. The expansion of data and the correction of magnification are shown in FIGS. 4a and 4f. The raster data having been corrected for a skew error and a magnification error are transmitted to the printer engine 200 through the data transmitting part 107.

Figure 9:
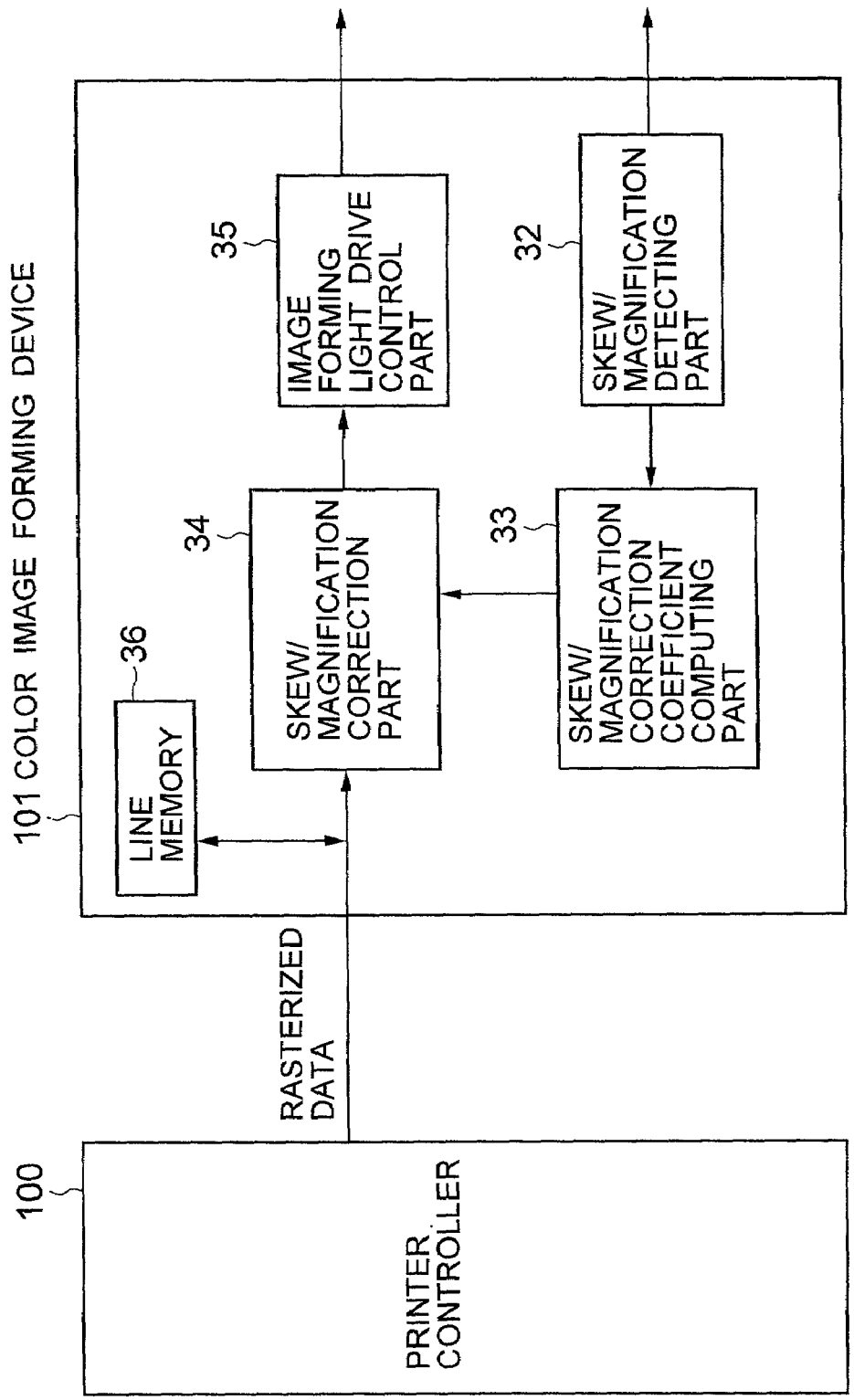
FIG. 9 is a block diagram illustrating a section relating to correction of a skew and a magnification in a color image forming device.
Figure 10A:
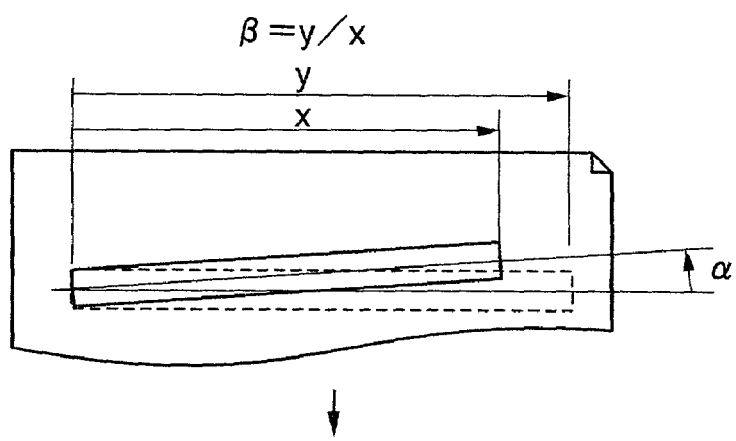
FIG. 10a is a view for explaining correction for a skew and a magnification in a conventional printer engine.
Figure 10B:
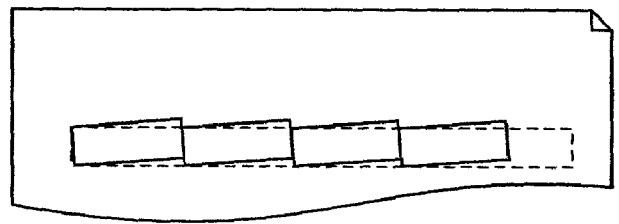
FIG. 10b is a view for explaining correction of a skew and a magnification in a conventional printer engine.
Figure 10C:
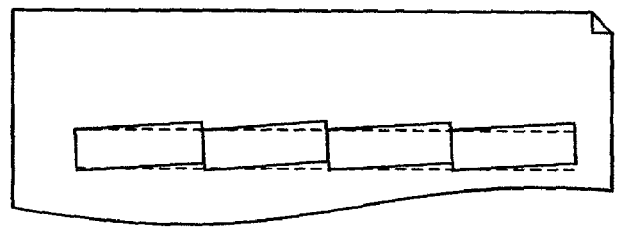
FIG. 10c is a view for explaining correction of a skew and a magnification in a conventional printer engine.

With the configuration as mentioned above, the correction of skew and magnification which has been conventionally made in the printer engine 200 can be made on the printer controller 100 side, the necessity of the line memory 36 in the printer engine 200 of prior art shown in FIG. 9 can be eliminated.

Although it has been explained hereinabove that the correction of skew, the compression and expansion of data and the correction of magnification are carried out by the microprocessor 301 in the configuration of this embodiment, it is possible to carry out all or a part of the above-mentioned processes with the use of hardware. Further, the skew and magnification rate computing part 33 in the printer controller 200 shown in FIG. 3 can be also materialized in the printer controller 100. Further, although it has been explained in this embodiment that four color printing is carried out, the present invention can be also applied basically to a tandem type printer engine which can process more than two colors. Further, although it has been explained that the image forming device using toner is used as the engine, the configuration of this embodiment of the present invention can be also applied to such an arrangement that the drawing is made by a plurality of line type inkjet heads.

As mentioned above, according to the configuration of this embodiment comprising the rasterizing part 103 for producing raster data as printing data, the skew correcting part 110 for correcting the raster data for a skew error in accordance with a correction coefficient delivered from the color image forming device 200 and indicating the skew error, the compression part 104 for compressing the raster data corrected for the skew error, for delivering the thus compressed raster data and for storing the compressed raster data in the memory, the expansion part 106 for expanding the stored compressed raster data so as to restore the raster data, and the magnification correcting part 111 for correcting the raster data delivered from the expansion part 106 for a magnification error in accordance with a correction coefficient delivered from the color image forming device 200 and indicating a magnification error, the correction for the skew error can be made in the printer controller during the compression of the raster data, and the raster data (printing data) can be transmitted to the printer engine while the correction for the magnification error is made during the expansion of the raster data, thereby it is possible to materialize the function of correction of skew and magnification at a low cost, with no addition of line memory on the printer engine side.

As mentioned above, with the configuration of the printer controller according to the first aspect of the present invention, the first aspect of the present invention, for delivering printing data to a color image forming device for forming a synthetic image in which a plurality of color images are superposed with one another, comprising the rasterizing part for producing raster data as printing data, the skew correcting part for correcting the raster data for a skew error in accordance with a correction coefficient delivered from the color image forming device and indicating a skew error, the compression part for compressing the raster data which is corrected for the skew error so as to deliver the compressed raster data, and for storing the same in a memory; the expansion part for expanding the stored compressed raster data so as to restore the raster data, and the magnification correcting part for correcting the raster data delivered from the expansion part for a magnification error in accordance with the correction coefficient delivered from the color image forming device and indicating a magnification error, the raster data (printing data) corrected for the skew error during compression within the printer controller can be transmitted to the printer engine while the raster data is corrected for the magnification error during expansion thereof, thereby it is possible to offer such an advantages that the function of correction of a skew and a magnification can be materialized at a low cost without adding a line memory on the printer engine side, and without the provision of circuits for correction for an skew error and a magnification error.

What is claimed is:

1. A printer controller for delivering printing data to a color image forming device for forming a synthetic image in which a plurality of color images are superposed with one another, said printer controller comprising:
    a rasterizer that produces raster data as printing data;
    a skew corrector that corrects the raster data for a skew error of the color image forming device in accordance with a correction coefficient delivered from the color image forming device to provide skew-corrected raster data;
    a compression part that compresses the skew-corrected raster data to provide compressed raster data, and that provides the compressed raster data to a memory for storage therein;
    an expansion part that expands the stored compressed raster data so as to restore the skew-corrected raster data;
    a magnification corrector that corrects the skew-corrected raster data delivered from the expansion part for a magnification error of the color image forming device in accordance with a correction coefficient delivered from the color image forming device to provide skew and magnification-corrected raster data; and
    an interface section that provides the skew and magnification-corrected data to the color image forming device.

2. A printing method comprising:
    a step of rasterizing original data and outputting raster data;
    a step of performing a skew correction, for a skew error of a color image forming device, to the raster data in accordance with a skew correction coefficient measured in the color image forming device in advance and outputting the skew-corrected raster data;
    a step of performing a compression of the skew-corrected raster data to provide compressed raster data, and providing the compressed raster data to a memory for storage therein;
    a step of performing an expansion of the stored compressed raster data so as to restore the skew-corrected raster data;
    a step of performing a magnification correction, for a magnification error of the color image forming device, to the skew-corrected raster data restored by said expansion step in accordance with a magnification correction coefficient measured in the color image forming device in advance; and a step of providing the skew and magnification-corrected data to the color image forming device.

3. A printer controller for delivering printing data to a color image forming device for forming a synthetic image in which a plurality of color images are superposed with one another, said printer controller comprising:

a rasterizer that produces raster data as printing data;

a magnification corrector that corrects the raster data for a magnification error of the color image forming device in accordance with a correction coefficient delivered from the color image forming device to provide magnification-corrected raster data;

a compression part that compresses the magnification-corrected raster data to provide compressed raster data, and that provides the compressed raster data to a memory for storage therein;

an expansion part that expands the stored compressed raster data so as to restore the magnification-corrected raster data;

a skew corrector that corrects the magnification-corrected raster data delivered from the expansion part for a skew error of the color image forming device in accordance with a correction coefficient delivered from the color image forming device to provide magnification and skew-corrected raster data; and an interface section that provides the magnification and skew-corrected data to the color image forming device.

4. A printing apparatus comprising:

a color image forming device that forms a synthetic image in which a plurality of color images are superposed with one another; and a printer controller that delivers printing data to a color image forming device, said printer controller comprising:

a rasterizer that produces raster data as printing data;

a skew corrector that corrects the raster data for a skew error of the color image forming device in accordance with a correction coefficient delivered from the color image forming device to provide skew-corrected raster data;

a compression part that compresses the skew-corrected raster data to provide compressed raster data, and that provides the compressed raster data to a memory for storage therein;

an expansion part that expands the stored compressed raster data so as to restore the skew-corrected raster data;

a magnification corrector that corrects the skew-corrected raster data delivered from the expansion part for a magnification error of the color image forming device in accordance with a correction coefficient delivered from the color image forming device to provide skew and magnification-corrected raster data; and an interface section that provides the skew and magnification-corrected data to the color image forming device.

* * * * *